(12) United States Patent
Adams

(10) Patent No.: US 7,413,383 B2
(45) Date of Patent: Aug. 19, 2008

(54) CHEMICAL-BIOLOGICAL STABILIZATION PROCESS FOR REPAIRING SOILS AND CUTTINGS CONTAMINATED WITH OILS AND PETROLEUM DERIVATIVES

(75) Inventor: Randy Howard Adams, Villahermosa (MX)

(73) Assignee: Universidad Juarez Autonoma De Tabasco, Villahermosa, Tabasco (MX)

( * ) Notice: Subject to any disclaimer, the term of this patent is extended or adjusted under 35 U.S.C. 154(b) by 0 days.

(21) Appl. No.: 10/598,320

(22) PCT Filed: Feb. 24, 2005

(86) PCT No.: PCT/MX2005/000013

§ 371 (c)(1), (2), (4) Date: Aug. 24, 2006

(87) PCT Pub. No.: WO2005/082553

PCT Pub. Date: Sep. 9, 2005

(65) Prior Publication Data

US 2007/0244022 A1   Oct. 18, 2007

(30) Foreign Application Priority Data

Feb. 27, 2004   (MX) .................. YU/A/2004/000001

(51) Int. Cl.
B09C 1/08 (2006.01)
(52) U.S. Cl. .................................. 405/128.1
(58) Field of Classification Search ............... 405/128.1
See application file for complete search history.

(56) References Cited

U.S. PATENT DOCUMENTS 4,913,586 A * 4/1990 Gabbita .................. 405/128.75
5,486,474 A   1/1996 Bradley et al.
5,525,139 A   6/1996 Gill
6,060,292 A   5/2000 Gray et al.

FOREIGN PATENT DOCUMENTS

| EP | 0 678 348 A1 | 10/1995 |
| JP | 05/228499 A * | 9/1993 |
| JP | 10272450 A * | 10/1998 |
| WO | WO/90/10079 | 9/1990 |
| WO | WO/94/06884 | 3/1994 |
| WO | WO/98/28046 | 7/1998 |
| WO | WO/01/12352 A1 | 2/2001 |

OTHER PUBLICATIONS

Adams, Randy H., "Chemical-biological stabilisation of hydrocarbon-contaminated soil and drilling cutting in tropical Mexico", Land Contamination & Reclatmation, vol. 12 (2004) pp. 349-361.

* cited by examiner

*Primary Examiner*—John Kreck
(74) *Attorney, Agent, or Firm*—Cook Alex Ltd.

(57) ABSTRACT

The present invention describes a process utilized for the remediation of soils and petroleum drilling wastes contaminated with hydrocarbons, which consists in stabilization by application and mixing in specific proportions of calcium oxides and organic conditioners. It is possible to treat materials with concentrations of at least seven percent (dry weight) of hydrocarbons petroleum hydrocarbons (TPH) and reduce the concentration to 1-1.5% TPH. Furthermore, residual toxicity is completely eliminated in the treated material, vegetative growth is stimulated, the treated material does not present significant concentrations of hydrocarbons leachates and it passes all criteria to be considered not a dangerous waste (CRETI or TCLP).

14 Claims, No Drawings

CHEMICAL-BIOLOGICAL STABILIZATION PROCESS FOR REPAIRING SOILS AND CUTTINGS CONTAMINATED WITH OILS AND PETROLEUM DERIVATIVES

BACKGROUND

In the Gulf of Mexico Region, a grand industry has been generated for the production and refining of hydrocarbons. Related to this industry are the production of oily wastes from exploration and production, typically containing residual diesel, which is used in the formulation of drilling muds.

On the other hand, this region has suffered many spills due to corroded piping. There are some oil fields older then fifty years old. Many of these are in marsh areas or in mangroves o other swamps. Since pipelines were installed to connect individual wells to separation batteries, and from there to refineries and petrochemical plants, the anaerobic corrosion was not considered to be important, and as a result, many pipelines are corroded and spilling oil. Lately, Petroleos Mexicanos has been installing pipeline with protection, or made of non-corrodible materials to take care of this problem. The kinds of soils more commonly affected are from low lying areas, this kind of soil has high concentrations of organic material and clay. Some contaminated sites are found in the recent coastal plain, in sandy soil. Although the number of these last sites is less, it is of greater concern due to the probable impact on aquifers, due to their high permeability.

In addition to the chronic spills caused by corrosion in the production fields, Petroleos Mexicanos in the refining area manages approximately 13 thousand kilometers of pipelines in the country which frequently are affected by spills due to clandestine robberies of oil from the pipelines, especially between Minatitlan, Veracruz and Puebla State.

There also exist dumps of semisolid oily waste in the region. Due to the climatic condition in the Gulf of Mexico Region (above all high precipitation), industrial landfills are not permitted, as in other parts of the republic, such as Mina N. L. (see Bremer, 1995 and the Official Mexican Norm NOM-CRP004-ECOL/1993). Due to this limitation, as well as the generation of large quantities of oily waste resulting from drilling muds, marshy vegetation and soils contaminated by spills, muds from systems for the treatment of waste water from petrochemical plants and refineries, the petroleum districts previously used oil well confinement pit. Normally, the used the main waste pit in an oil well that never produced petroleum, or an old well that does not produce and is capped. These pits were never designed to receive the quantity of waste put in them and were not constructed of impermeable materials. Many times all of the space in the pit was used up but waste was still deposited at the site, especially in the drilling platform, beside the pit. This inadequate management of wastes frequently resulted in run off and infiltrations of hydrocarbons in the nearby environment.

Besides the above mentioned sources, there exist effluents from petrochemical plants and refineries. Many of these have old API (American Petroleum Institute) type water treatment systems which separate less dense and denser fractions by gravity. Generally, they were not adequate to control the quantity of oil in the flow, resulting in the contamination of nearby areas, commonly marshes, canals, rivers and lagoons. These waters regularly contain salts from the petroleum deposit, in addition to hydrocarbons, which can adversely affect the marshes and water bodies.

In this region it is difficult to determine exactly the extension of land which is contaminated, due to political and economic interests in the region, exaggeration and the confusion which is to be found. In recent years the theme of "contamination" has been politicized and there exists an "industry of claims". Just in Tabasco State, Beltran (1993) reports that there are approximately 7,200 hectares affected, of these more than 90% are in marshes or floodable areas. More recently, Petroleos Mexicanos, with help from the Mexican Petroleum Institute has identified approximately 300 hectares contaminated in the state and 178 pits which are contaminated with oily wastes are projected to be restored (LaJous, 1997). Much of this difference is due to the definition of "contaminated areas", and the criteria used to determine it.

The levels of contamination vary much according to the sources of hydrocarbons and the age of the petroleum installations. In the extreme western part of Tabasco State, where the majority of installations are older, some around 50 years old, it is common to have hydrocarbon spills coming from corroded pipelines. In general, the extension of a spill is a stain of approximately 5 hectares, in which the concentration of hydrocarbons can reach up to 30% (Rodriguez, 1997).

En the more recent areas of petroleum activity, for example in the north and northeast of Tabasco State, the techniques used to protect the environment were bettered over the years. In this zone, the pipelines are newer, and many have a covering to reduce the corrosion. Due to this, the spills caused by corrosion of pipelines are much less. Additionally, the design, construction, and management of waste pits were improved and much fewer problems of infiltrations or runoff are to be found (Vinalay, 1998). In this part of the state it is rare to encounter zones with obvious stains of oil. Near the petroleum wells, the extension of hydrocarbons is normally less than one hectare and with concentrations less than 1000 ppm TPH (Total Petroleum Hydrocarbons, Dominguez, 1998).

It is worth mentioning that the new policy of Petroleos Mexicans is not to leave oily wastes in pits during the drilling of wells. When the phase of drilling in which inverse muds are require takes place, these are recycled in the most possible way; the spent muds and contaminated cuttings are deposited in a concrete pit with a laminate roof or in containers. Periodically, these wastes are recollected for treatment in a central site among various wells. However, there are many areas which have been contaminated by historical practices of the last century.

Besides the above mentioned activities related to exploration, production and refining of petroleum, there also exist various sites in the Mexican republic which are contaminated due to inadequate use of the products derived from petroleum. Among these include spills of fuels and lubricants in the great industrial areas dedicated to the manufacture of goods, such as can be found in Mexico City, Federal District, in Mexico State, Monterrey, N. L., Saltillo, Coahuila, Guadalajara, and various areas of the Bajio region, among others.

Furthermore, spills in thermoelectric plants in the country, bus stations and repair shops, airports and marine ports should be considered, due to the use of large volumes of lubricants and fuels.

It is important to look for appropriate technological solutions to the characteristic conditions of the country, in climatic, social and economical terms. In this context, it should be mentioned the value of developing remediation technologies as alternatives for the recovery of impacted ecosystems and agroecosystems, and to avoid problems of health risk. However, today almost all of the technologies used for remediation of contaminated soil or treatment of drilling cuttings are from abroad, which requires the importation of know-how, materials, reagents and sometimes machinery and personnel. This situation has consequences such as in the increase in costs, the creation of dependency from abroad, and many times these technologies are not implemented adequately. Various times it has been necessary to send remediation projects out to bid repeatedly due to the incompletion of contractors or due to the lack of service providers which are incompetent to realize the solicited task adequately, causing delays and increasing the administrative costs related to the remediation. On the other hand, it is common the bad management of imported technologies results in infertility in treated soils. For these reasons the effectiveness is frequently reduced, and the remediation contractors have great difficulty in meeting the established goals of their client (Petroleos Mexicanos) and the environmental authorities.

Below a description of the remediation technologies most used in the region is presented:

Confinement

This consists of the excavation of contaminated materials and the placement of these materials in a site prepared for their final deposition, said site having a series of engineering controls such as liners, leachate ponds, monitoring wells, etc., which assure that the contaminated material will never be in contact with biological receptors. It is important to select an adequate site for the location of this kind of remediation, one having low precipitation, with geological horizons that reduce possible migration, a depth to aquifer of hundreds of meters, without seismic activity and out of the paths of hurricanes and tropical storms. These conditions exist in few areas of the country, being one of the principal limitations of this technology. Currently, their is only one site (in Mina, Nuevo Leon) of this type at the national level, which means that contaminated materials must be transported large distances, practically doubling the cost.

Reuse—Recycling

In these kinds of technologies the contaminated material is neutralized and reutilized for another purpose, typically for construction. Drilling cuttings have been incorporated into raw materials on the fabrication of cement and bricks; in the process the hydrocarbons are incinerated. The principal limitation of this technology is the local market for these materials, which reduce the quantity of materials that a cement or brick plant can receive and treat. Another application of this technology has been the production of structural base for rural roads or parking areas, in Poza Rica and the Lazaro Cardenas Refinery (Minatitlan, Veracruz), using soil of other materials which are extremely contaminated with oil as raw material. This technology is appropriate only for very contaminated materials, which contain approximately 30% or more of hydrocarbons, and where the hydrocarbons are of a very viscous type. It is not applicable to the majority of spills or drilling cuttings.

Incineration

In the incineration of materials to be treated, they go by a conveyor to an oven, commonly rotary, or "rotary kiln", in which they are heated to temperatures greater than 800° C. to completely burn all of the organic contaminants. The residue is the mineral fraction of the soil and some ashes; all of the organic substances are burned. This is effective to treat soil with any kind of organic contaminant including viscous crude oil, PBCS, dioxins, chlorophenols, and many pesticides. However, the cost is high. Abroad it is approximately $100-$500 USD per ton of treated soil. The resulting material is not fertile. For use in crops, pasture, or nature refuge, it is necessary to add mulches and to realize a recovery of the soil structure which increases the technology cost even more. There has been only one remediation project with this technology in the southern part of the country (Mexico), in the Cinco Presidentes Oil Field (Tabasco). During the project there were problems with the high humidity content and organic matter in the soil to be treated, and they had to re-run several batches of material through the oven more than once, increasing costs. Furthermore, there were problems in maintaining the equipment functioning due to local labor customs, and the lack of parts and trained personnel. Due to this experience this technology was discarded as a remediation technology by PEMEX Exploration and Production, South Region.

Thermal Description

In this technology the materials to be treated go by a conveyor to an oven where they are heated, but only to volatilization temperature, not incineration. The vapors are collected in an extraction hood and are incinerated in a smaller oven at a high temperature, or they are treated by other processes such as condensation, or reuse, among others. The mass to be incinerated is reduced, this being the vapors instead of all of the material, reducing energy costs. The process is less costly than incineration and completes with other technologies in terms of costs for small volumes. It is effective for volatile and semi-volitile organic contaminants: drilling cuttings, soil contaminated with gasoline, diesel, light and medium crude petroleum. The treated material still conserves some fertility; the majority of the soil organic material is not burned. None-the-less, this technology is complicated in the Gulf of Mexico region due to the high humidity in the soil, which implies a higher energy cost to be heated. On the other hand, the equipment is imported, and for this reason represents problems with logistics to obtain parts and trained personnel for its implementation, all of which increase operation costs. Likewise, there are not mobile equipment in the region, making it necessary to transport contaminated materials to a central treatment centre and thereby increasing costs.

Chemical Oxidation

This technology depends on the partial oxidation of the hydrocarbons and mineral fraction using non-specific oxidants. In some methods part of the hydrocarbons are mineralized. In others the oxidized minerals and hydrocarbons are united to stabilize the material. The reagent dosification, pH, homogenization, and curing of the mix are managed. Typically, this results in a reduction in the hydrocarbon concentration of only 60-70%, being inadequate for the treatment of materials with high concentrations. Commonly, the reagents added are toxic and cause problems in the soil, including infertility. The majority of chemical oxidation technologies depend on the importation of reagents making the remediation more costly.

Chemical Stabilization

In the chemical stabilization, chemical reagents are added to the contaminated material which result in pozzolanic reactions in said material, sometimes adding other kinds of reagents which work to improve the fixation, such as polymers, ashes, silica, hydrophobilizing agents, etc. The use of chemical substances, especially calcium oxides which promote pozzolanic reactions, is also used in the construction industry to firm up bland materials, permitting the construction of roads, buildings, etc. on such materials. Internationally, this technology has been used for the stabilization of contaminated materials, but in general in low concentrations. In Mexico, this is not currently being used for remediation of waste treatment.

Microencapsulation

In the microencapsulation the different phases of free oil, water and sediment are separated with gravity separators, similar to API separators. The recovered sediment is mixed in liquid form with a cationic surfactant, forming micelles of surfactant and the organic contaminant. A solution of silicates (or carbonates) is applied that precipitate on the cationic nuclei of the micelles forming small grains of silicates with the consistency of sand. This does not work well for organic soils but it does work for mineral soils with less than 10% of total organics. The material can have problems at temperatures above 40° C. and this aspect needs to be watched. The homogenization and dosification are very important. It is effective for all kinds of organic contaminants and even materials slightly contaminated with metals. The reagents used are mostly imported. In the southern part of the country there has been difficulty implementing this technology due to the fact that it requires close attention to detail for its application. Generally, the regional population is not detail oriented and there have been problems in materials mixing, frequently having to treat a batch of material more than once to decontaminate it, reducing efficiency in the process, and increasing costs. This technology has been abandoned by PEMEX Exploration and Production, South Region due to the problems, but it still is being used in a limited way by the Marine Zone for the treatment of drilling cuttings.

Bioremediation

Bioremediation uses native and introduced microorganisms that consume organic contaminants, reducing their concentration. Conditions such as humidity, nutrition, aeration, and mixing are managed to optimize microbial activity. This technology is relatively economical but it is slow, requiring a constant mixing of the material in treatment to maintain aerobic conditions. Furthermore, it requires large area for treatment. None-the-less, due to the relatively low cost in comparison with other physical-chemical remediation technologies, it is one of the most used technologies in the southern part of the country.

Biochemical Degradation

Biochemical degradation treatment consists of the application and mixture of different reagents in waste pits to promote a series of chemical and biological reactions. Commonly, at the outset, surfactants are added to the drilling cuttings to mobilize hydrocarbons and make them more available for subsequent treatment. If a significant quantity of free phase oil is produced, this is collected on the surface. Afterward, an oxidant such as hydrogen peroxide is applied to partially oxidize the hydrocarbons. Lastly, inorganic nutrients and "organic catalyzers", such as manure are mixed into the material to promote biodegradation. All of these operations are carried out using excavators, or dredges, mixing the material sequentially in the same waste pit in which the material (such as drilling cuttings or other wastes) was originally stored. This method has an advantage over other methods because it is not necessary to construct a treatment cell, thereby reducing costs, area, and simplifying the logistics of remediation projects. Nevertheless, there are potential problems with this method due to the semisolid conditions which are created in the waste pit, and because the equipment used is not adequate to provide sufficiently aerobic conditions for the oleophilic microorganisms employed in the biological treatment phase. Because of this, the biodegradation rates are much reduced, prolonging treatment times, and increasing costs due to equipment rental, fuel, and labor. On the other hand, the waste pits in which these materials are encountered, are not impermeable, and the constant mix of materials in them, as well as the application of surfactants con provoke the mobilization and infiltration of hydrocarbons, contaminating aquifers, many of which are only a few meters below the soil surface in the southern region (from <1 m up to 5 m, in general). The other inconvenience of the technology, as with bioremediation, is the necessity to constantly mix the material during the biological treatment phase, which increases costs (machinery, fuel, labor).

Composting

It is a non-specific oxidation of vegetable tissues and organic contaminants carried out by fungi and actinomycetes. Concurrently, a spontaneous chemical polymerization of the subproducts takes place resulting in the formation of humus, a more stable form with low toxicity (humification). To implement this kind of treatment, organic conditioners are added and chemical and physical conditions (humidity, temperature, aeration, nutrition) are controlled. The application of this technology is limited due to the requirement of large quantities of organic amendments in the mixture (typically 70%) and logistic problems in obtaining the large volumes necessary. Furthermore, by adding such large volumes of material, the project costs are increased due to the need to also increase the amounts of reagents, machinery rental, fuel and labor. It has only been used in tow sites in the southern part of the county, in the Sanchez Magallanes Oil Filed, Tabasco, and in the Santa Alejandrina marsh, behind the Lazaro Cardenas Refinery in Minatitlan, Veracruz.

Phytoremediation

Phytoremediation is the use of plants to immobilize contaminants in the soil and subsequently detoxify the material by mineralization and humification processes in which plant roots as well as rhizosphere associated microbes participate. It is very slow and today it is not used in Mexico, however, there are preliminary experiments in tropical environments using above all grasses for the cleanup of soils contaminated with hydrocarbons (Zavala et al. 2002, Hernandez and Pager 2003). It does not work for contamination below the root zone, for example in a waste pit, and for certain kinds of contaminants there may be concern of contaminant migration to adjacent lands before the remediation of the site is accomplished.

Discussion on Process Function

Various physical, chemical and biological processes are involved in the functioning of this technology. During the initial treatment with calcium oxides, it is probable that a pozzolanic reaction takes place between these and clay silicates in the soil or drilling cuttings with the subsequent formation of calcium silicates, calcium aluminates and hydrated calcium aluminum silicates (LaGrega et al. 1996). This process has been used to stabilize clayey soils for use as construction material (McKennon et al. 1994), as well as for macroencapsulation of soils contaminated with hydrocarbons or other oily compounds, sometimes in combination with other additives (such as fly ash, silica, cement, polymers or hydrophobilizing agents, Shimoda et al. 1989; Masuda et al. 2001; Kao et al. 2000; Ritter 1995; Weitzman and Hamel 1989; DuPont 1986; Al-Tabbaa and Evans 2003).

Among patents of special interest are: McKennon et al. (1994), for solidification of clayey soil for construction purposes; Shimoda et al. (1989), which employs quicklime and/or dolomite in combination with a polymer (PFTE) for the stabilization of hydrocarbon contaminated soil, Masuda et al. (2001), which uses calcium oxides and derivatives thereof for the stabilization of soil contaminated with dioxins and PCBs, Kao et al. (2000), which combines a mixture of additives such as calcium oxides and a heating process in ovens which immobilizes organic and inorganic contaminants, and Ritter (1995), which adds hydrophobilizing agents with lime to render waste substances inoffensive. Nonethe-less, these methods only stabilize soil with relatively low concentrations of organic contaminants and result in only partial treatment. In none of these patents is the use of calcium oxides in combination with organic conditioners contemplated for the stabilization of materials contaminated with hydrocarbons or oily contaminants.

During the next phase of the treatment, when organic amendments are added, absorption is probably the principal process involved, at least initially. It has been shown that absorption of organic contaminants is soil is primarily due to the soil organic content (Chiou et al. 1979), especially the humic substances therein (Bogan et al. 2003), and several organic materials, mostly of vegetable origin have been used as sorbents for the treatment of waters and waste waters (Perez et al. 2002; Choi 1996; Varghese and Cleveland 1998; Deschamps et al. 2002). Among the patents of interest in this context, there is Perez et al. (2002), in which the use of sugar cane bagasse is mentioned for the treatment of petroleum contaminated water. Studies have also suggested that the type of humic materials in soil affect the sorption of these compounds (see Gauthier, 1987, for example) and have proposed the addition of refined humic substrates for remediation of xenobiotic contaminated soils (Fukushima et al. 2002).

Following the initial sorption of the hydrocarbons to the organic materials added, further biological and chemical processes are probably involved in the remediation. Some of the more available hydrocarbons are likely mineralized by oleophilic microorganisms, these kinds of hydrocarbons being readily biodegraded (Atlas 1986; Xie and Barcelona 2003). However, it is probable that a considerable portion of the hydrocarbons are sequestered by humification reactions thereby reducing the availability in the soil and the relative toxicity (Alexander 1995; Kelsey and Alexander 1997; Barr and Aust 1994; Paul and Clark 1989; Bohn et al. 2001; Ehlers and Luthy 2003; Bogan and Sullivan 2003; White et al. 1999).

Various investigators and inventors have also proposed adding organic materials to contaminated soil to stimulate microbial mediated treatment, by sorption into the organic amendment and subsequent decomposition of the vegetable organic matter and organic contaminant, either by mineralization or humification reactions (Breitenbeck and Grace 1997; Valo et al. 1991; Bradley et al. 1996; Grey et al. 2000; Gill 1996; Torstensson and Castillo 1997).

Important patents in this context are: Bradley et al. (1996), which suggest the use of sugar beet pulp enriched to increase its nitrogen content, in combination with white rot fungi for the decomposition of aromatic compounds, including polycyclic aromatic hydrocarbons (PAHs) and chlorinated aromatic compounds; Valo et al. (1991), on the treatment of soil contaminated with chorophenol, using *Rhodococcus* and *Mycobacterium*, in a process in which heat is generated by composting (to increase the biodegradation rate), and in which the bacteria are immobilized on a polyurethane support; Grey et al. (2000), which uses composting for the decomposition of the xenobiotic methoxychlor; and Gill (1996), which is about inoculating cotton waste with contaminated soil, composting the mixture, mixing the composted material with contaminated soil (a ratios of 1:1 to 1:5) plus adding chemical accelerators, and maturing the mixture at ambient temperature, as well as composting of organic material used as an absorbent for contaminants. In contrast to the chemical-biological stabilization in this proposal, these researchers have used primarily composting techniques, frequently using much greater amounts of organic amendment (on the order of 30-70% organic matter, instead of 1-10% as in this patent application), in a process that is qualitatively different; or they propose the application of modified organic amendments, instead of unmodified amendments.

During the maturation phase of the process, the role of the plant rhizosphere may also be important. Plant roots assist bioremediation in the soil by a number of processes. Initially, they are important because they assimilate organic substances, such as hydrocarbons, effectively immobilizing them among the roots. Subsequently, they stimulate microbial by exuding organic compounds that act as cosubtrates for oleophilic microorganisms. Also, when the roots grow they open up the soil, increasing aeration and improving drainage. Many of these processes also stimulate microorganisms that act in the humification of organic contaminants. For example, many rooty materials, especially lignin containing substances, can serve as food for actinomycetes and fungi, the principal microbes involved in the production of soil humus. Additionally, some plants have enzymes which initiate the breakdown of some hydrocarbons, especially the aromatic fraction (Zavala et al. 2002; Adams and Castillo 2004; Adams and Castillo 2000; Schnoor et al. 1995; Carman 1997; Carman et al. 1997; Drake 1997, Drake 1997a, Hernandez and Pager 2003). After a few months, it is common to observe a vigorous herbaceous growth, being an important aspect of this method, which demonstrates not only the detoxification of soil and drilling cuttings, but also improvements in the soil productivity as well.

BENEFITS OF THE INVENTION

Using criteria commonly considered for stabilization technologies, this method effectively remediates the soil or drilling cuttings. In the treated material, total petroleum hydrocarbon concentrations are low, and the residual hydrocarbons are completely sequestered: the material shows almost a null concentration of leachates (<1 ppm TPH in the extract), and normally does not have carcinogenic PAHs. Likewise, the toxicity of the treated material, using the *Photobacterium* bioassay (NMX-AA-112-1995-SCFI), is null or even stimulates the test organism. This bioassay is an effective tool to determine toxicity and it approximates the toxicity to many terrestrial and aquatic vertebrates and invertebrates (Doherty 2001). This coupled to the soil fertility recovery makes this a desirable treatment method.

There are various benefits of this technology in comparison with technologies currently used in the country. It is relatively simple but effective technology, and uses materials, reagents, machinery and labor experience from the same region in which the majority of drilling wastes are generated and where the majority of oil spills are found in the country. This is important, since it frees the country of the dependency on importation, and the high cost this generates. On the other hand, it is sufficiently simple that it can be efficiently implemented by unspecialized personnel and with labor customs which are not detail oriented. Furthermore, it is not necessary to constantly mix materials, as with other common remediation technologies such as bioremediation and "biochemical degradation treatment", avoiding the associated cost (machinery rental, fuel, labor, and administrative costs). Another important benefit of this technology is that it not only detoxifies the soil or drilling cuttings, but it improves soil properties due to the application of organic amendments, improving the fertility and agricultural and livestock productivity of the soil.

It is important to mention that this process not only functions for soil, but it is possible to convert drilling cuttings into productive materials in agricultural and livestock terms using this method. Drilling cuttings generally have too low of a concentration of organic material, lack soil structure and show poor internal drainage, all of which results in very low fertility. After several months of treatment using this technology, an internal structure in the material is observed, not of a cutting, but of a soil with productive soil conditions, and a vigorous growth of pasture and herbaceous vegetation is observed.

Comparison to Other Patents and Processes

Methods have been developed for the treatment of waste waters contaminated with organic compounds and metals, using humic compounds, as well as agricultural wastes, but these methods have not been applied to the treatment of contaminated soil. Furthermore, these methods do not incorporate the use of calcium oxides in the process (Perez et al. 2002, Choi 1996, Varghese and Cleveland 1998, Deschamps et al. 2002). On the other hand, there are various patents which use calcium oxides for the treatment of soil contaminated with different organic compounds and metals, but not in combination with organic conditioners. There is one patent in which a polymer and lime are combined for soil treatment, and one which uses lime modified with fatty acids (Shimoda et al. 1989, Masuda et al. 2001, Kao et al. 2000, Ritter 1995).

With respect to the use of organic conditioners, there are various patents which employ them for treatment in composting methods. Nevertheless, the process which is used is qualitatively different than that proposed in the present patent application. The those methods, the material is treated by mineralization, and above all, by humification, and therefore require elevated concentrations (approximately ≧70%) of organic conditioners, whereas the process proposed in this patent application is a biological stabilization (absorption, chelation, and integration into the soil aggregates) and requires concentrations of soil conditioners much lower (<10%). On the other hand, some patented processes only use modified organic materials instead of fresh organic materials. Furthermore, these composting processes do not incorporate treatments with calcium oxides. (Breitenbeck and Grace 1997, Valo et al. 1991, Bradley et al. 1996, Grey et al. 2000, Gill 1996, Torstensson and Castillo 1997).

As a bibliography, the following patents and patent publications are mentioned: (1) Bradley, C. A., Kearns, R. D., Wood, P. P. and Black, W. E. 1996, Bioremediation Method Using a High Nitrogen Containing Culture of White Rot Fungi on Sugar Beet Pulp, U.S. Pat. No. 5,486,474, United States Patent Office; (2) Gill, P. E. 1996, Process for Bioremediation of Soils, U.S. Pat. No. 5,525,139, United States Patent Office; (3) Grey, N. C., Moser, G. P., Moser, L. E. 2000, Compost Decontamination of Soil Contaminated with Methoxychlor, U.S. Pat. No. 6,060,292, United States Patent Office; (4) Kao, R. Lee, A. L., Mensinger, M. C., Randhava, S. S., Randhava, S. S. and Rehmat, A. G. 2000, Process for Preparing Environmentally Stable Products by Remediation of Contaminates Soils and Sediments, Patent Application No. 97953412, European Patent Office; (5) Masuda, S., Shimme, K. and Kubo, T. 2001, Method for Treating Hazardous Material, Patent Application No. PCT/JP00/05236, World Intellectual Property Organization; (6) McKennon, J. T., Hains, N. L., and Hoffman, D. C. 1994, Method for Stabilizing Clay Bearing Soils by Addition of Silica and Lime, Patent Application No. PCT/US93/08351, World Intellectual Property Organization; (7) Pérez M., L., Ávila P., P., López V. H., and Jose Y., M. 2002, Material Extrayente para Descontaminación de Cuerpos de Agua y Aguas Residuales a Partir de Bagazo de Caña, Aplicación de Patente No. PA/a/1999/004699, Instituto Mexicano de la Propiedad Industrial; (8) Ritter, R. A. 1995, Method for Rendering Waste Substances Harmless, Patent Application No. 95250091, European Patent Office; (9) Shimoda, T., Ishikawa, K., Urano, T., Miyaji, H., and Ogura, M. 1989, A Soil-Stabilizing Agent and Method for Soil-Stabilizing Treatment, Patent Application No. 88117396, European Patent Office; and (10) Valo, R. J., Häggblom, M. M., Salkinoja-Salonen, M. 1991, Process and Means for the Microbiological Remediation of Polluted Soil and Microorganisms for said Process, Patent Application No. 90903838, European Patent Office. These patents and references and all other references, publications and patents mentioned herein are hereby incorporated by reference hererto.

DESCRIPTION OF THE INVENTION

The process of chemical-biological stabilization for the remediation of soil and cuttings contaminated with oils and derivatives of petroleum, consists of the application of a sequence of steps, as well as the utilization of calcium oxides and conditioners which achieve the transformation of the organic contaminant in an inoffensive material, all of which is used as indicated in the following description.

The area in which the contaminated material is treated, which we shall call a cell, this cell is used to avoid runoff of hydrocarbons to the subsoil or adjacent lands, said treatment cell being of materials and using designs typical of land farm bioremediation.

The cell has dimensions sufficient in area to be able to accommodate all of the materials to be treated, as well as the conditioners that are to be added at a height no greater than approximately 50 centimeters. It is important that the cell be leveled with a grade of approximately 1-2% toward a leachate pond. In the majority of soils a liner of at least 30 mil (approx. 0.76 mm) thick, made of high density polyethylene (HDPE) and thermally sealed is recommended. In very clayey and compacted soils it may not be necessary to use a liner, when this is confirmed by a geotechnical study. Besides these considerations, it is important that the work area be surrounded by berms of minimum height of 1-2 meters.

Once the cell is ready the contaminated materials such as soil and/or sediment and/or drilling cuttings, are placed in the cell, to which is added a chemical reagent which contains a calcium oxide, such as calcium monoxide (quick lime), and/or calcium hydroxide (hydrated lime), or any combination of these coming from formulations or natural mineral sources. The concentration of calcium oxide resulting from the mixture of soil and/or sediment and/or drilling cuttings with the chemical reagent which contains the calcium oxide is in the interval of 1-10% on a dry weight basis for the mixture.

The materials are thoroughly mixed until their homogenization is achieved, and moistened to approximately 70 to 100% of the field capacity of the material, then completely mixed and the mix is left to set for a determined period; said period may vary from 2 hours to 180 natural days.

Once this period has passed, organic conditioners are added to the mixture in a concentration of 1 to 15% on a dry weight basis of the mixture. Once this is completely mixed, the material being treated is placed on a layer of sand, gravel, sandy soil or other similar material to improve the free drainage of the material being treated and to maintain aerobic conditions; the thickness of the drainage material is 5 to 30 centimeters and the thickness of the material in treatment which is placed on top is approximately 5 to 150 centimeters. Sometimes one can add inorganic nutrients to the mix in treatment to stimulate the microbial and vegetative biological activity.

Once the cell is prepared, the materials are not mixed, and are left to set to mature by a mineralization and humification process during a variable period of 15 to 730 natural days. For this part of the treatment vegetation can be planted or the material left to be naturally seeded by native weeds from the environment. During the maturation phase the cell is periodically monitored.

The chemical-biological stabilization process for the remediation of soil and cuttings contaminated with oils and derivatives of petroleum was applied for its study in various samples. For an understanding of this process, an enuciative example is included, but which is by no means the only way in which this technology can be employed. In this example the process is applied to a soil with from a petroleum spill or a derivative thereof, or petroleum drilling cuttings that contain residual concentrations of hydrocarbons derived from drilling muds.

In this example the contaminated material is excavated if necessary, using heavy machinery such as excavators, dredges, retroexcavators, front-end lifters, etc., and the material is placed in the area previously prepared for material treatment. This area, called a treatment "cell" in this patent application, is previously conditioned to avoid runoff of hydrocarbons to the subsoil or adjacent land using materials and designs typical of a bioremediation land farm. To the material to decontaminate calcium oxides are added in quantities sufficient to produce alkaline conditions (pH approximately 9-12), usually in concentrations of 1-10%. The mixture is homogenized with heavy equipment such as that previously described and subsequently moistened to a specific percent (approximately 70-100% of the field capacity of the material), mixing completely, and letting the mixture set for a specific period of time.

Subsequently, organic conditioners such as, but not limited to, sawdust, coconut husk, rice husk, wheat husk, cacao husk, sugar cane cachasse, sugar cane bagasse, bamboo or eucalyptus waste, among others are added in concentrations of approximately 1-15%.

Alternatively, the steps described previously which involve the addition of calcium oxides, homogenation and the addition of organic amendments and homogenation, can be realized in containment ponds of dams instead of in a treatment cell, if it is more convenient, for example if the contaminated materials are in ponds. This is especially convenient for drilling cuttings and other oily wastes, which are typically deposited en holding cells for temporary storage.

Once the material is completely mixed, the material in treatment is placed on top of a layer of sand, gravel, sandy soil or other similar material to improve the free drainage of the material in treatment and to maintain aerobic conditions. Typically, the depth of the material used to improve drainage, which may be sand or gravel, among others, is 5-30 cm thick and the depth of the material placed on top is approximately 10-70 cm. Sometimes, if it is necessary, inorganic nutrients can also be added to the mixture in treatment to stimulate microbial and vegetable biological activity.

Once the material in treatment is extended for curing, the materials are not mixed, but left to rest to cure by mineralization and humification processes during a specific time period, for example from three to 12 months. For this part of the treatment vegetation can be planted or the material can be left to be naturally seeded by native weeds from the environment. It is common to observe a vigorous growth of herbaceous vegetation after a few months.

During the curing phase, the cell is monitored periodically, for example at one month, three months, six months and at 12 months. The samples are analyzed to demonstrate de effectiveness of the remediation according to the criteria in the General Law on Environmental Equilibrium and Protection of the Environment (Ley General de Equilibrio Ecologico y la Proteccion al Ambiente, LGEEPA), arts. 134, sec. V, art. 136, secs. II, III and IV, and art. 152-BIS, as well as those in the norm NOM-EM-138-ECOL-2002, num. 8.3.4, using the following tests: analysis of total petroleum hydrocarbons (TPH), methods EPA 418.1, EPA 8015 m or EPA 9074, with an acceptable criteria of $\leq$1.5% TPH; analysis of polycyclic aromatic hydrocarbons (PAHs), methods EPA 8270, EPA 8310, with an acceptable criteria in accordance with that defined in an risk evaluation, or in an interval corresponding to background levels for the region in which the technology is applied (approx. 2-10 ppm); analysis of toxicity using bioassays, such as NMX-AA-112-1995-SCFI (*Photobacterium*) or NMX-AA-087-1995-SCFI (*Daphnia*), being not toxic or in an interval corresponding to background levels for the region in which the technology is applied; analysis of leachate potential using the "PECT" procedure of the CRETI analysis (NOM-MX-053-ECOL) and analysis of the extract for TPH using methods EPA 418.1, or EPA 8015, with an acceptable remediation criteria being $\leq$1 ppm TPH in the extract; with additional criteria of pH in the range of 6-9; and considering fertility, according to vegetative growth or by analysis of soil properties (field capacity, cation exchange capacity, organic carbon, apparent density, total nitrogen, available phosphorous).

All of the above to demonstrate the detoxification (prevention of alterations in the biological processes in soil—in compliance with the LGEEPA, art. 136, sec. II, and prevention of health risk—LGEEPA art. 136, sec. IV) conservation of utility or fertility (preservation from alterations in the use or exploitation of the soil—LGEEPA, art. 136, sec. III).

Having described the present invention it is considered novel and, therefore, the following are claimed as property.

The invention claimed is:

1. A process of chemical-biological stabilization for the remediation of soil and cuttings contaminated with oils and derivatives of petroleum, in which the transformation of the organic contaminant into an inoffensive material is achieved, comprising:
    (a) confining contaminated material selected from the group consisting of soil, sediment, drilling cuttings contaminated with petroleum derivatives, and combinations thereof;
    (b) mixing said contaminated material with a chemical reagent that contains calcium hydroxide (hydrated lime) in concentrations of between approximately 1 and 10 percent on a dry weight basis of the contaminated material to provide a homogenized mixture;
    (c) allowing the mixture to rest for a period of time between about 2 hours and about 180 natural days;
    (d) thereafter adding at least one organic conditioner to the homogenized mixture at a concentration of between approximately 1 and about 15 percent on a dry weight basis of the mixture to provide a conditioned mixture; and
    (e) curing the conditioned mixture by mineralization and humidification processes during an at-rest period which is between about 15 and about 730 natural days.

2. The process described in claim 1, characterized in that the process is cyclic by repeating different parts of the treatment on the same batch of contaminated material being treated.

3. The process described in claim 1, characterized in that the mixing of contaminated material with the chemical reagent that contains calcium oxide is repeated, and said allowing of the mixture to rest is repeated.

4. The process described in claim 1, characterized in that the step where organic conditioners are added to the homogenized mixture of chemical reagent plus contaminated material is repeated, and subsequently extending the homogenized mixture in a layer for curing.

5. The process described in claim 1, characterized in that the calcium hydroxide used in the mixture is from formulations or natural mineral sources.

6. The process described in claim 1, characterized in that the chemical reagent applied to the mixture contains substances which convert to calcium hydroxide when in contact with soil, sediment, cuttings, water moisture, or free water.

7. The process described in claim 1, characterized in that the organic conditioners that are added to the mixture of chemical reagent with the other materials is selected from the group consisting of sawdust, coconut husk, straw, alfalfa, pineapple wastes, citrus wastes, pasture, marshy vegetation, organic peat, bamboo wastes, eucalyptus wastes, banana wastes, sugar cane cachasse, sugar cane bagasse, cacao husk, cow manure, horse manure, pig manure, goat manure, and mixtures thereof.

8. The process described in claim 1, wherein said confining is an area having dimensions adequate to accommodate the contaminated material at a depth of not greater than about 50 cm.

9. The process described in claim 8, further including grading the contaminated material with a grade between about 1 percent and about 2 percent.

10. The process described in claim 1, wherein said confining further includes using a liner of at least about 30 mil (approximately 0.76 mm) thick of high density polyethylene (HDPE), thermally sealed.

11. The process described in claim 1, wherein a moisture level of the mixture is between about 70 weight percent and about 100 weight percent, based upon the total weight of the mixture during the allowing-to-rest procedure.

12. The process described in claim 1, further including positioning the contaminated material on a drainage surface selected from the group consisting of sand, gravel, sandy soil, and the like, said positioning providing the mixture including contaminated material at a thickness of between about 5 and about 150 cm.

13. The process described in claim 1, further including adding inorganic nutrients to the conditioned mixture.

14. The process described in claim 1, further including planting vegetation with the conditioned mixture.

* * * * *

UNITED STATES PATENT AND TRADEMARK OFFICE
CERTIFICATE OF CORRECTION

PATENT NO. : 7,413,383 B2
APPLICATION NO. : 10/598320
DATED : August 19, 2008
INVENTOR(S) : Adams It is certified that error appears in the above-identified patent and that said Letters Patent is hereby corrected as shown below:

On title page, Item (56), under "Other Publications", Adams, Randy H., "cutting" should read --cuttings--, and "Reclatmation" should read --Reclamation--.

Col. 1, line 16, "o" should read --or--.

Col. 1, line 45, "pit" should read --pits--.

Col. 1, line 46, the first "the" should read --they--.

Col. 2, line 20, "En" should read --In--.

Col. 2, line 25, insert --the-- before "corrosion" and insert --frequent-- after "much less".

Col. 2, line 35, insert a comma after "drilling".

Col. 2, line 36, insert a comma after "require", "require" should read --required--, and insert --muds-- after "these".

Col. 2, line 43, insert --the-- after "related to".

Col. 2, line 46, insert --the-- after "due to".

Col. 2, line 62, insert --the-- after "used for".

Col. 2, line 63, insert --the-- after "soil or".

Col. 3, line 2, insert --At-- before "Various", and "Various" should read --various--.

Col. 3, line 5, "incompetent" should read --competent--, delete "to", insert --in-- after "competent", and "realize" should read --realizing--.

Col. 3, line 7, insert --that-- after "it is common".

Col. 3, line 8, insert --the-- before "infertility", insert --of-- after "infertility", and delete the second "in".

Col. 3, line 19, "deposition" should read --disposition--.

Col. 3, line 31, insert --across-- after "transported".

Col. 3, line 38, "on" should read --in--.

Col. 3, line 43, "base" should read --bases--.

UNITED STATES PATENT AND TRADEMARK OFFICE
CERTIFICATE OF CORRECTION

PATENT NO. : 7,413,383 B2
APPLICATION NO. : 10/598320
DATED : August 19, 2008
INVENTOR(S) : Adams It is certified that error appears in the above-identified patent and that said Letters Patent is hereby corrected as shown below:

Col. 3, line 54, insert --known as a-- after "commonly".

Col. 3, line 60, "PBCS" should read --PCBs--.

Col. 4, line 22, "completes" should read --competes--.

Col. 4, line 25, insert --and-- after "diesel,".

Col. 4, line 27, reverse the words "soil" and "organic".

Col. 4, line 29, insert --amount of-- after "the high".

Col. 4, line 30, delete "be", "heated" should read --heat--, and insert --the soil-- after "heat".

Col. 4, line 32, delete "to", insert --in-- after "with logistics", and "obtain" should read --obtaining--.

Col. 4, line 34, "not" should read --no--.

Col. 4, line 55, insert --process-- after "chemical stabilization".

Col. 4, line 56, "result" should read --results--.

Col. 4, line 57, insert --and-- after "material,".

Col. 4, line 65, delete the first "in" and "general" should read --generally--.

Col. 4, line 66, insert --the-- after "being used for".

Col. 5, line 2, insert --process-- after "microencapsulation".

Col. 5, line 34, insert --a-- after "it requires".

Col. 5, line 57, insert --the-- after "reducing", insert --and-- after "costs", and delete the comma after "costs".

Col. 6, line 11, insert --Composting-- before "is a" and delete "It".

Col. 6, line 21, "logistic" should read --logistical--.

Col. 6, line 26, "Filed" should read --Field--.

Col. 6, line 53, insert --the-- after "as well as for".

UNITED STATES PATENT AND TRADEMARK OFFICE
CERTIFICATE OF CORRECTION

PATENT NO. : 7,413,383 B2
APPLICATION NO. : 10/598320
DATED : August 19, 2008
INVENTOR(S) : Adams It is certified that error appears in the above-identified patent and that said Letters Patent is hereby corrected as shown below:

Col. 6, line 61, insert --the-- before "solidification".

Col. 6, line 64, delete the comma and insert a semi-colon after "soil".

Col. 6, line 66, delete the comma and insert a semi-colon after "PCBs".

Col. 7, line 2, delete the comma and insert a semi-colon after "contaminants".

Col. 7, line 4, "Nonethe-less" should read --None-the-less--.

Col. 7, line 14, insert --the-- before "absorption", delete the first "is", and insert --in-- after "contaminants".

Col. 7, line 15, "soil" should read --soil's--.

Col. 7, line 26, insert --the-- after "substrates for".

Col. 7, line 49, "suggest" should read --suggests--.

Col. 7, line 62, "ratios" should read --ratio--.

Col. 7, line 64, insert --the-- after "as well as".

Col. 7, line 67, "composting" should be italicized.

Col. 8, line 1, "amendment" should read --amendments--.

Col. 8, line 48, insert --a-- before "relatively".

Col. 9, line 30, delete the first "The" and insert --In-- before "those methods".

Col. 9, line 55, insert --the-- before "Remediation".

Col. 9, line 56, "Contaminates" should read --Contaminated-- and "Soils and Sediments" should read --Sediments and Soils--.

Col. 10, line 9, insert --use in-- after "for".

Col. 10, line 13, "hererto" should read --hereto--.

Col. 10, line 25, delete "this cell".

Col. 10, line 26, insert --the-- before "said treatment".

UNITED STATES PATENT AND TRADEMARK OFFICE
CERTIFICATE OF CORRECTION

PATENT NO. : 7,413,383 B2
APPLICATION NO. : 10/598320
DATED : August 19, 2008
INVENTOR(S) : Adams It is certified that error appears in the above-identified patent and that said Letters Patent is hereby corrected as shown below:

Col. 10, line 27, delete "using".

Col. 10, line 40, insert --a-- after "berms of".

Col. 11, line 5, insert --can be-- after "material".

Col. 11, line 14, delete "with".

Col. 11, line 25, delete "To" and insert --For-- after "land farm.".

Col. 11, line 26, insert a comma after "decontaminate".

Col. 11, line 43, delete the second "if" and insert --when-- after "for example".

Col. 11, line 46, "en" should read --in--.

Col. 11, line 67, "de" should read --the--.

Col. 12, line 12, the first "an" should read --a--.

Col. 12, line 28, delete "to".

Col. 12, line 31, insert --and-- before "conservation" and insert --the-- after "conservation of".

Col. 12, line 33, insert --of soil-- after "sec. III)".

Signed and Sealed this

Twenty-fourth Day of February, 2009

JOHN DOLL
*Acting Director of the United States Patent and Trademark Office*